United States Patent [19]

Bartos

[11] Patent Number: 5,245,997

[45] Date of Patent: Sep. 21, 1993

[54] VALVE CARTRIDGE ASSEMBLY FOR A PRESSURE REGULATOR OF SUPPLIED AIR BREATHING APPARATUS

[75] Inventor: Josef A. Bartos, Diamond Bar, Calif.

[73] Assignee: Respirator Research, Inc., Willoughby, Ohio

[21] Appl. No.: 802,532

[22] Filed: Dec. 5, 1991

[51] Int. Cl.⁵ ............................ A62B 18/10; A62B 9/02; F16K 31/14; F16K 25/00

[52] U.S. Cl. ......................... 128/205.24; 128/201.28; 128/204.26; 137/495; 137/454.6

[58] Field of Search ............... 128/201.28, 201.27, 128/204.18, 204.26, 204.27, 205.24, 207.12, 207.16; 137/494, 495, 454.6, 454.2

[56] References Cited

U.S. PATENT DOCUMENTS

| | | | |
|---|---|---|---|
| 2,787,286 | 4/1957 | Hansen | 137/495 |
| 2,868,223 | 1/1959 | Lum | 137/495 |
| 2,946,340 | 7/1960 | Hollman et al. | 137/495 |
| 2,951,494 | 9/1960 | Holmes | 137/64 |
| 3,097,638 | 7/1963 | Streimer | 128/2.07 |
| 3,783,891 | 1/1974 | Christianson | 137/491 |
| 4,041,978 | 8/1977 | Leemann | 137/494 |
| 4,094,314 | 6/1978 | LeCornec | 128/142.2 |
| 4,541,454 | 9/1985 | Sturman et al. | 137/495 |
| 4,624,444 | 11/1986 | Johnson | 137/495 |
| 4,971,050 | 11/1990 | Bartos | 128/204.18 |

Primary Examiner—Edgar S. Burr
Assistant Examiner—Kimberly L. Asher
Attorney, Agent, or Firm—Body, Vickers & Daniels

[57] ABSTRACT

A cartridge valve assembly is slidably and sealingly receivable in a recess therefor in the housing of a pressure regulator for supplied air breathing apparatus. The cartridge valve is preassembled and slidably inserted as a unit in the pressure regulator housing recess, and the body is provided with an external shoulder engaged by a headed fastener in the housing to retain the cartridge valve assembly in the housing recess. The cartridge comprises a cylindrical body having a bore therethrough in which a valve stem is slidably supported for a valve element thereon to open and close the bore at one end thereof providing an air outlet for the valve. An air inlet port opens radially through the body into the bore, and the outer surface of the body carries O-ring seals on axially opposite sides of the air inlet port which sealingly engage the cartridge recess. The end of the body opposite the air inlet pivotally supports a valve stem actuating lever arm.

36 Claims, 6 Drawing Sheets

VALVE CARTRIDGE ASSEMBLY FOR A PRESSURE REGULATOR OF SUPPLIED AIR BREATHING APPARATUS

BACKGROUND OF THE INVENTION

This invention relates to the art of supplied air breathing apparatus and, more particularly, to a valve cartridge assembly for the pressure regulator in such apparatus.

It is of course well known to provide supplied air breathing apparatus of the character including a source of breathing gas supplied to the user of the apparatus through a pressure regulator or pressure demand valve which is connected either directly or through a hose to a face mask worn by the user and which is responsive to the user's inhaling and exhaling so as to provide the appropriate flow rate of breathing gas to the user. Pressure demand valves for use with such breathing apparatus often include a diaphragm actuated flow control valve which opens and closes in response to inhaling and exhaling by the user such that breathing gas from the source flows to the face mask or face piece worn by the user during inhaling and stops during exhaling. Examples of such pressure regulators or pressure demand valves in supplied air breathing systems are shown in U.S. Pat. No. No. 2,951,494 to Holmes; U.S. Pat. No. 3,097,638 to Streimer; U.S. Pat. No. 3,783,891 to Christianson; U.S. Pat. No. 4,041,978 to Leemann; U.S. Pat. No. 4,094,314 to LeCornec; and, U.S. Pat. No. 4,971,050 to Bartos.

In use of supplied air breathing apparatus including a pressure regulator of the character shown in the foregoing patents, the diaphragm actuated flow control valve within the regulator is subjected to relatively rapid wear as a result of the number of cycles of operation of the control valve during use thereof. For example, if the user is breathing at a medium rate of 20 to 30 breaths per minute, for example, the flow control valve cycles 100 to 150 times during five minutes of use of the breathing apparatus. Furthermore, the component parts of the flow control valve are subjected to moisture and other contamination during use of the breathing apparatus. As a result of such wear and contamination, the component parts of the flow control valve most often deteriorate to a point requiring repair or replacement long before other parts of the pressure regulator require repair or replacement. Moreover, in many pressure regulators, the flow control valve is not readily accessible for inspection or cleaning, whereby deterioration is accelerated.

Heretofore, deterioration of component parts of the flow control valve has required either replacement of the pressure regulator in its entirety, or rebuilding of the flow control valve portion of the pressure regulator if accessible. In this respect, if the component parts of the flow control valve are not accessible for repair or replacement work, then the entire pressure regulator must be replaced. Even if the component parts of the flow control valve are accessible, repair or replacement thereof involves a time consuming, piece-by-piece disassembly and reassembly of the component parts of the valve and, upon reassembly, calibration of the valve to assure proper operation thereof in conjunction with subsequent use of the pressure regulator. Furthermore, such disassembly and reassembly of the component parts may be so time consuming as to render replacement of the entire pressure regulator more economical than repair of the flow control valve portion thereof. In either event, the cost is undesirably high. Moreover, repair and replacement of component parts of the flow control valve cannot be achieved in the field, or by the user who lacks technical knowledge or experience required in connection therewith, whereby such maintenance requires return of the pressure regulator to a suitable shop for such work which results in a loss of the availability of the breathing apparatus to the user for the period required to rebuild and return the pressure regulator.

SUMMARY OF THE INVENTION

In accordance with the present invention, a flow control valve cartridge assembly is provided which advantageously minimizes or overcomes the foregoing problems in connection with breathing apparatus pressure regulators heretofore available. More particularly in this respect, a valve cartridge in accordance with the present invention is a pre-assembled air flow control valve unit which can be readily removed from the pressure regulator housing and replaced in the field and by the user of the breathing apparatus. This advantageously avoids the necessity for replacing the entire pressure regulator, or the time, cost and technical expertise required to remove and replace the component parts of the flow control valve, piece-by-piece, and the lost time of use of the breathing apparatus resulting therefrom. The valve cartridge assembly includes a valve body having air inlet and outlet ports, a stem within the body for opening and closing the outlet port, a biasing and sealing member within the body which seals the air flow passage therethrough and biases the stem to close the outlet port, a component for supporting a stem actuator by which the stem is moved to open the outlet port, external seals which sealingly interengage the cartridge and a recess therefor in the pressure regulator housing, and a surface on the body engagable with a fastener in the housing for releasably retaining the cartridge in the recess. All that is necessary to replace the valve unit is to release the same from the housing, slide the cartridge out of the recess, slide a new cartridge into the recess, and resecure the new cartridge in place. By providing for the air flow control valve to be in cartridge form the cost of construction thereof can be minimized, thus further promoting economy with respect to replacement thereof, and the valve can be calibrated at the time of manufacture, thus enabling the replacement thereof in a pressure regulator to be achieved in the field and by the user with minimum down time for the associated breathing apparatus. Moreover, the removability facilitates inspection and cleaning of the cartridge unit thus to promote a longer life therefor.

It is accordingly an outstanding object of the present invention to provide a valve cartridge assembly removable and replaceable as a unit from the housing of a pressure regulator in supplied air breathing apparatus.

Another object is the provision of a valve cartridge assembly of the foregoing character which enables minimizing the time and expense heretofore required in connection with repairing and/or replacing component parts of the air flow control valve in a breathing apparatus pressure regulator.

Yet another object is the provision of a valve cartridge of the foregoing character which provides for inspection, cleaning and/or replacement of the air flow control valve in a breathing apparatus pressure regulator in the field and by the user of the apparatus.

Still a further object is the provision of a valve cartridge of the foregoing character which is structurally compact and constructed from a minimum number of parts, thus making the valve cartridge economical to produce.

Yet a further object is the provision of a valve cartridge of the foregoing character comprising a cylindrical body axially slidably received in a recess therefor in the pressure regulator housing and sealingly interengaged therewith and which includes air inlet and outlet ports, a valve stem arrangement including a valve element for opening and closing the outlet port, a biasing and sealing arrangement between the stem and body biasing the valve element to close the outlet port, a support for a valve stem actuator by which the valve element is displaced to open the outlet port, and a surface on the body engagable by a fastener in the pressure regulator housing for releasably retaining the cartridge in the recess therefor.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which.

DESCRIPTION OF PREFERRED EMBODIMENTS

Figure 1:
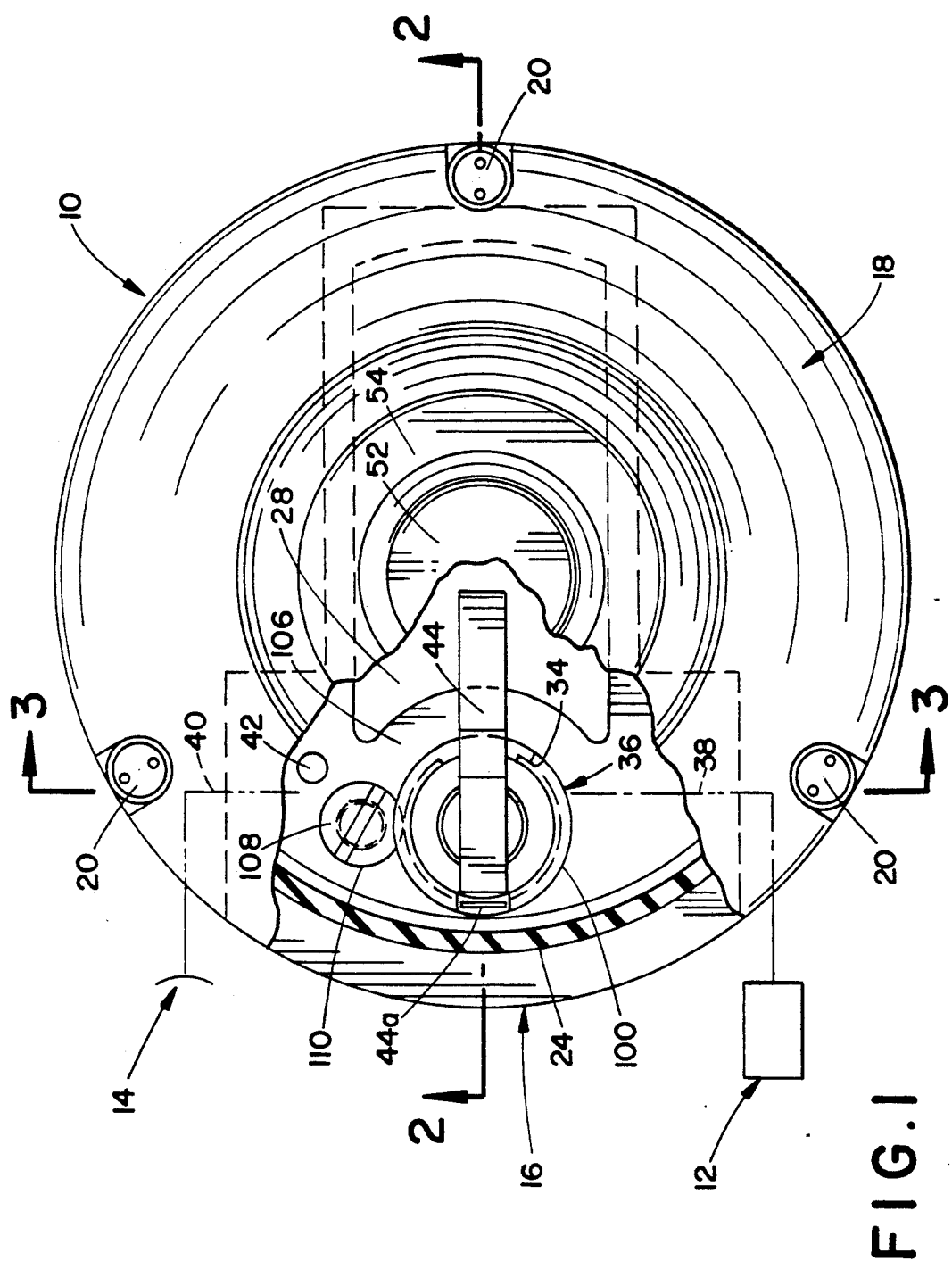
FIG. 1 is a plan view, partially in section, of a pressure regulator for supplied air breathing apparatus provided with an air flow control valve cartridge in accordance with the invention.
Figure 2:
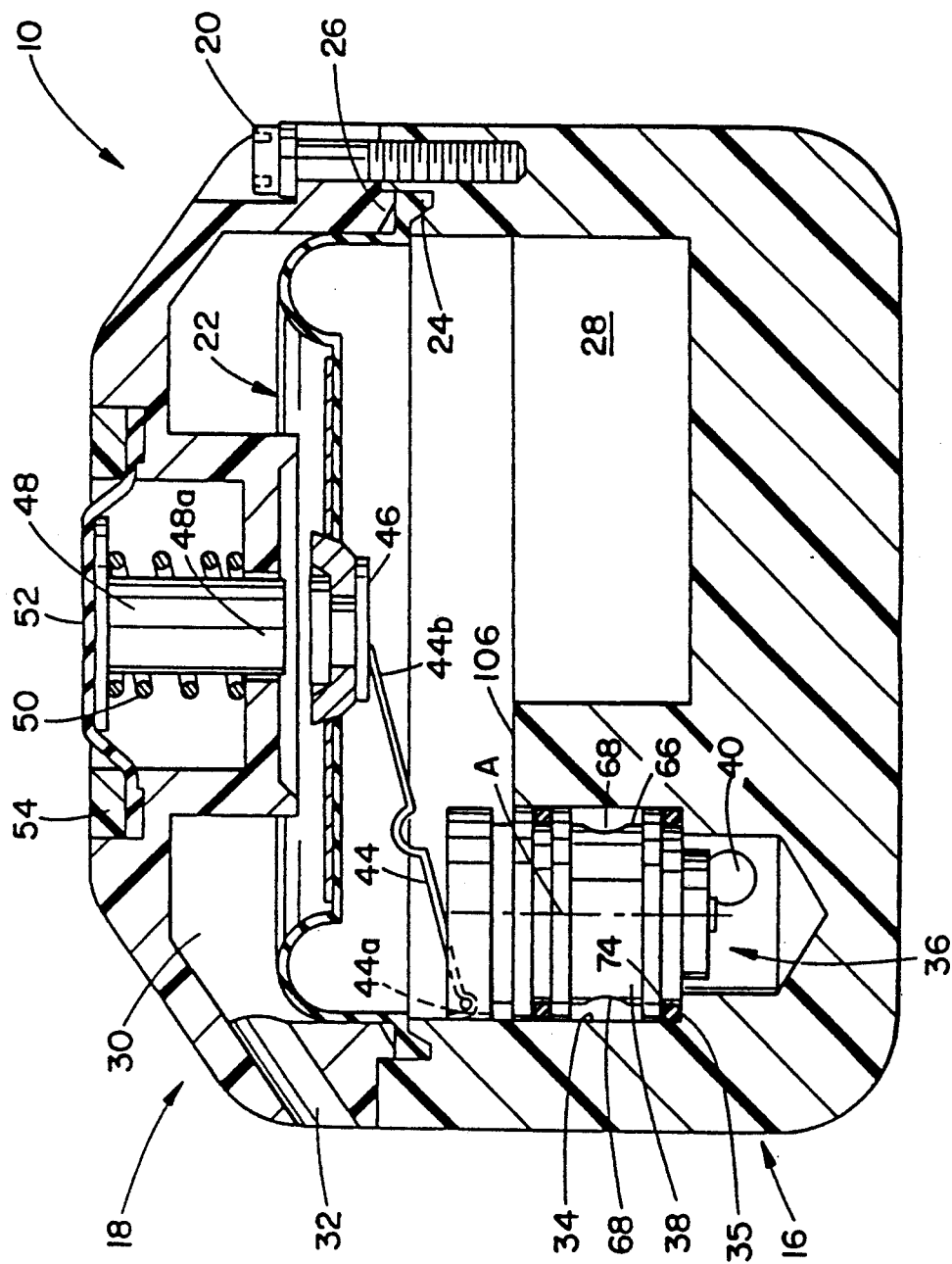
FIG. 2 is a sectional elevation view through the pressure regulator taken along line 2—2 in FIG. 1.
Figure 3:
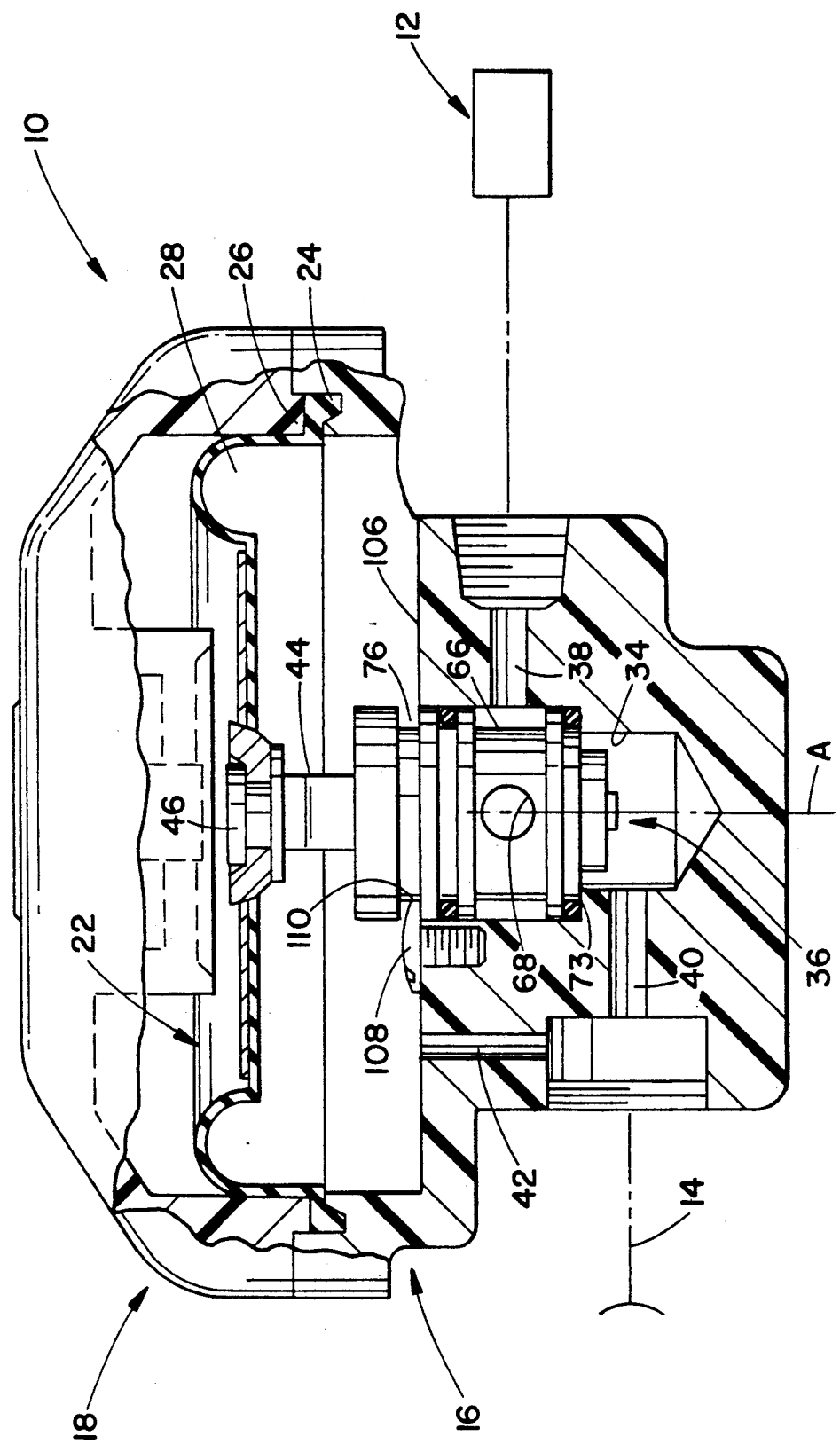
FIG. 3 is a sectional elevation view through the pressure regulator taken along line 3—3 in FIG. 1.

Referring now in greater detail to the drawings, wherein the showings are for the purpose of illustrating preferred embodiments of the invention only, and not for the purpose of limiting the invention, FIGS. 1-3 illustrate a pressure regulator 10 for use in a supplied air breathing system including a source 12 of breathing gas under pressure connected to the inlet side of the pressure regulator and a user utilization device 14 which can be, for example, a face mask connected to the outlet side of the pressure regulator by a breathing hose, or a face mask including the pressure regulator and directly connected to the pressure regulator outlet. Pressure regulator 10 includes a housing which, in the orientation of the parts illustrated in FIGS. 2 and 3, includes a lower housing portion 16 and an upper or cover portion 18 secured to lower portion 16 by a plurality of threaded fasteners 20. A flexible diaphragm 22 of suitable elastomeric material has its outer periphery clampingly engaged between a recess 24 in lower housing portion 16 and a projection 26 on upper housing portion 18, and the diaphragm divides the interior of the pressure regulator housing into lower and upper diaphragm chambers 28 and 30, respectively. Upper chamber 30 is vented to atmosphere by means of one or more openings 32 through upper housing portion 18.

Lower housing portion 16 includes a cylindrical recess 34 which is coaxial with and axially slidably receives an air flow controlling valve cartridge 36 having an axis A. Cartridge 36 is described in detail hereinafter and is operable to control the flow of air from source 12 to user utilization device 14. Recess 34 has upper and lower portions interconnected by a radially inwardly extending shoulder 35 which serves to position cartridge 36 therein as will be described hereinafter. As best seen in FIG. 3, lower housing portion 16 has an air flow passageway therethrough which includes an air inlet passageway 38 to which breathing gas source 12 is connected and an air outlet passageway 40 to which user utilization device 14 is connected. Inlet passageway 38 opens into recess 34 intermediate the opposite ends of cartridge 36, and outlet passageway 40 opens into recess 34 below the lower end of cartridge 36. Lower housing portion 16 further includes a passageway 42 communicating outlet passageway 40 with lower diaphragm chamber 28. The air flow control valve defined by cartridge valve 36 is adapted to be actuated by diaphragm 22 to open the air flow passageway through lower housing portion 16 and, for this purpose, a valve actuating lever arm 44 has one end 44a thereof pivotally supported at the upper end of valve cartridge 36 and its opposite end 44b slidably engaging a button 46 provided generally centrally on diaphragm 22. Upper housing portion 18 is provided with a pushrod 48 (FIG. 2) having an inner end 48a facing diaphragm button 46. Pushrod 48 is manually displaceable in the direction toward diaphragm button 46, for the purpose set forth hereinafter, and is biased outwardly to the position shown in FIG. 2 by a coil spring 50. The outer end of pushrod 48 is covered by a cover 52 of flexible material suitably secured to upper housing 18 such as by a retaining ring 54.

Figure 4:
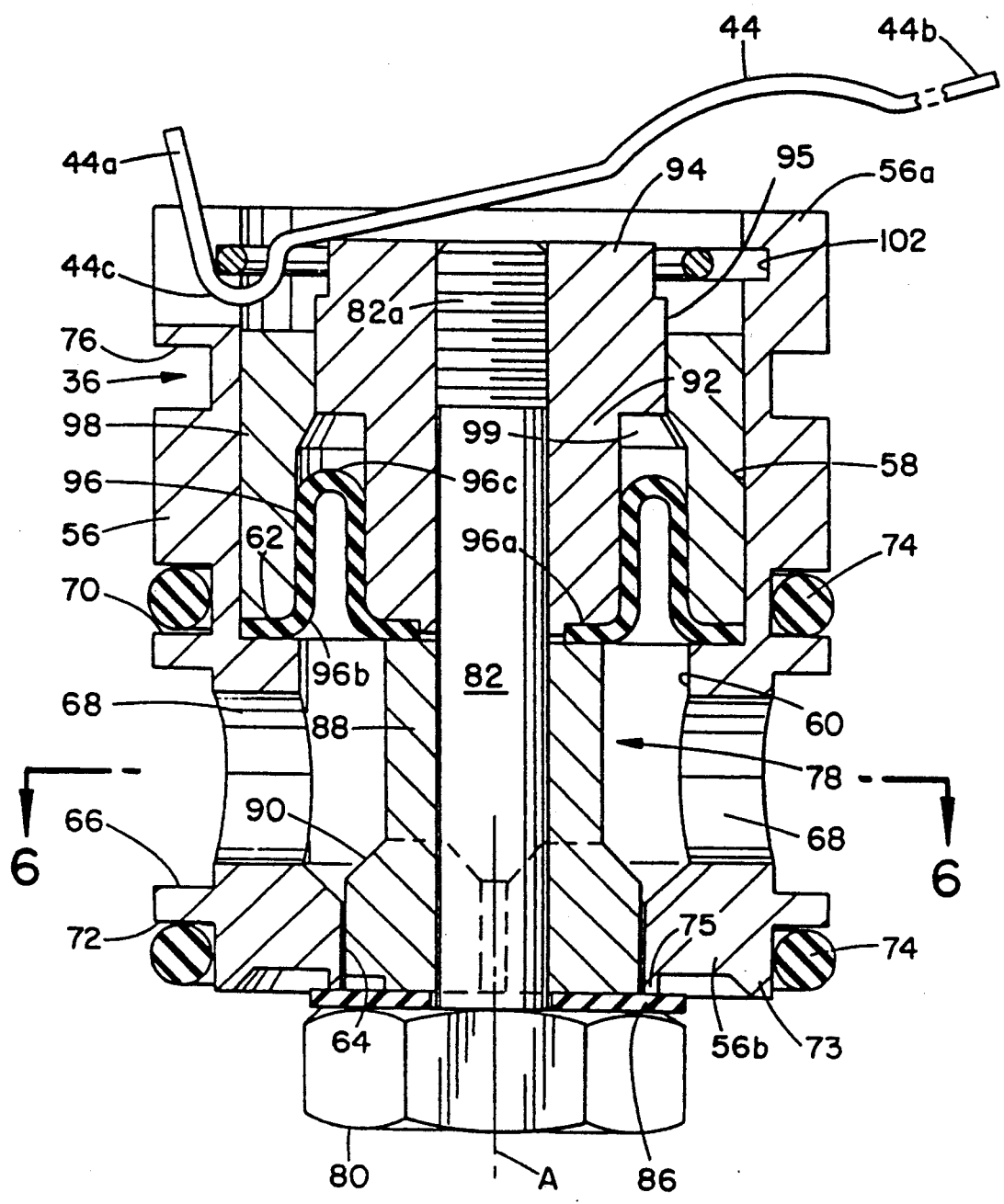
FIG. 4 is an enlarged sectional elevation view of a valve cartridge assembly according to the present invention.
Figure 5:
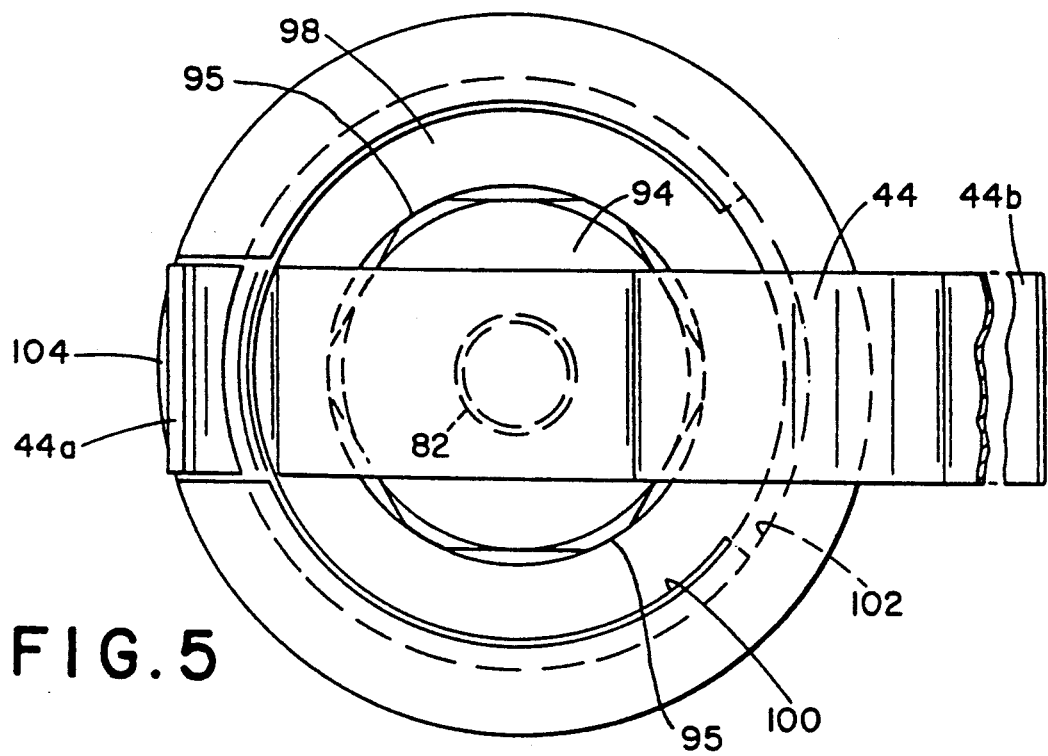
FIG. 5 is a plan view of the valve cartridge assembly.

In accordance with the present invention, valve cartridge 36 is a pre-assembled air flow control valve unit which is axially slidably insertable into housing recess 34, thus to provide for the valve to be functional in connection with operation of the pressure regulator. Likewise, the valve cartridge is readily axially slidably displaceable from the housing recess to facilitate inspection, cleaning and/or replacement thereof. In the embodiment of valve cartridge 36 illustrated in FIGS. 4-6 of the drawings, the cartridge is comprised of a cylindrical valve body 56 coaxial with axis A and having axially opposite upper and lower ends 56a and 56b, respectively. Body 56 is provided with a bore therethrough between ends 56a and 56b which is coaxial with axis A and includes an upper portion 58, an intermediate portion 60 defining a radially inwardly extending peripheral shoulder 62 with upper portion 58, and a lower portion 64 through lower end 56b of the body and defining an outlet port through the body. The cylindrical outer surface of body 56 is provided with a radially outwardly open circumferential recess 66 between ends 56a and 56b, and diametrically opposed inlet ports 68 open radially through the body from the bottom of recess 66 to intermediate portion 60 of the bore therethrough. The outer surface of body 56 is also provided with a radially outwardly open circumferential groove 70 between upper end 56a and inlet ports 68, and an outwardly and downwardly open circumferential groove 72 at lower end 56b of the body. Grooves 70 and 72 receive corresponding O-ring seals 74 which are accordingly on axially opposite sides of recess 66 and thus inlet ports 68. The outer surface of body 56 is further provided with an outwardly opening circumferential groove 76 adjacent upper end 56a of the body for the purpose set forth hereinafter. The axially outer end face of body 56 at lower end 56b thereof is axially recessed to provide an annular rib 73 defining the lower end of groove 72 and which serves to position cartridge 36 in housing recess 34 as set forth more fully hereinafter. The recess in the end face further provides an annular valve seat 75 in the form of an annular lip projecting axially outwardly of the end face and extending about the outlet port defined by lower bore portion 64.

Figure 6:
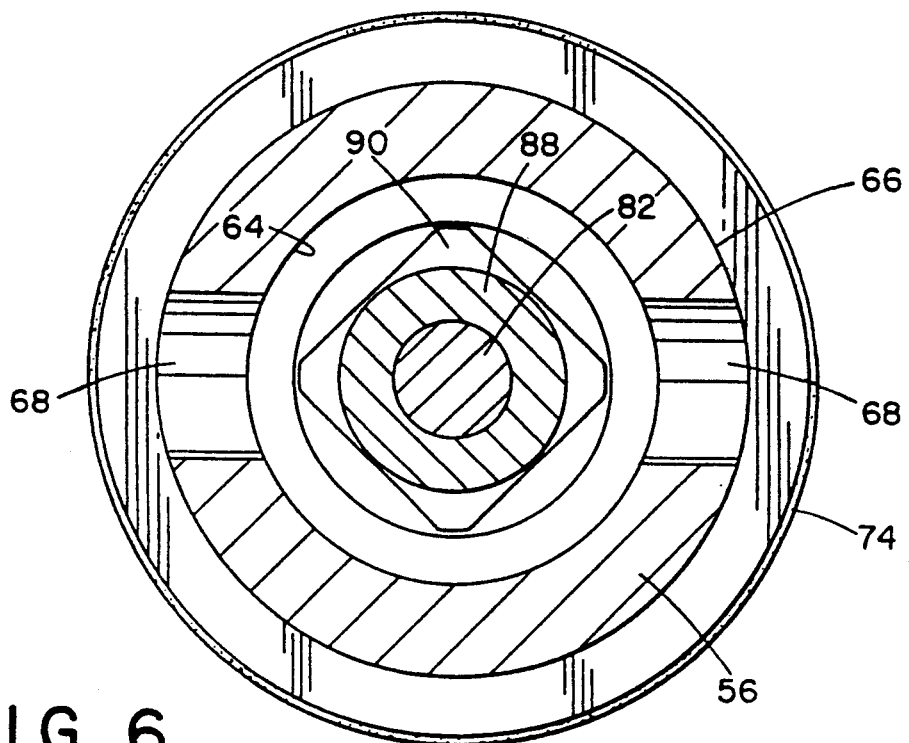
FIG. 6 is a cross-sectional view through the valve cartridge taken along line 6—6 in FIG. 4; and, FIG. 7 is a sectional elevation view of another embodiment of a valve cartridge assembly according to the present invention.

A valve stem assembly 78, coaxial with axis A, is axially slidably supported in the bore through body 56 for opening and closing the outlet port defined by lower bore portion 64. The valve stem assembly includes a valve stem member in the form of a bolt having a head 80 axially outwardly adjacent lower end 56b of the body and a shank 82 having an upper end adjacent upper end 56a of the body. An annular valve element 86 of rubber or the like surrounds bolt shank 82 adjacent the axially upper side of bolt head 80 for engagement with and disengagement from valve seat 75 in response to reciprocation of the valve stem assembly. The valve stem assembly further includes a lower sleeve member 88 received on shank 82 and having an enlarged lower end 90 extending through lower bore portion 64 and abutting against the corresponding side of valve element 86 to hold the latter against head 80. As shown in FIG. 6, the outer periphery of lower end 90 of sleeve 88 is square which provides for the flow of air therepast through the outlet port and for engagement of the major diametric points thereof with lower bore portion 64 to guide axial displacement of the corresponding end of the valve stem assembly. The valve stem assembly further includes an upper sleeve 92 received on shank 82 and having an enlarged, internally threaded upper end 94 interengaging with threads 82a on the upper end of shank 82 to axially retain sleeves 88 and 92 on the shank.

Sleeves 88 and 92 have opposed, axially inner ends, not designated numerically, and an annular biasing and sealing diaphragm 96 has its radially inner periphery 96a axially clampingly captured between the inner ends of sleeves 88 and 92. Diaphragm 96 has a radially outer periphery 96b axially clampingly captured between shoulder 62 at the lower end of upper bore portion 58 and the axially inner end of a retaining ring 98 received in and having a press fit with upper bore portion 58. The axially inner ends of sleeve 92 and retaining ring 98 are radially spaced apart to define a circumferential space 99 therebetween, and diaphragm 96 has an undulated portion 96c between the radially inner and outer peripheries 96a and 96b thereof and which undulated portion extends axially upwardly in space 99. Diaphragm 96 provides a seal between the stem assembly and the bore through body 56 in the area between upper end 56a of the body and inlet ports 68. Moreover, the diaphragm is preformed to the configuration shown in FIG. 4 and to have an inherent bias which biases the stem assembly and valve element 86 to the closed position relative to the outlet port. As will be appreciated from FIG. 5, the upper inner surface of retaining ring 98 is cylindrical and the upper periphery of outer end 94 of sleeve 92 is hexagonal and is dimensioned for the major diametric points 95 thereof to slidably interengage with the inner surface of sleeve 98 to guide the corresponding end of the stem assembly.

As mentioned above, the air flow control valve is diaphragm actuated through lever arm 44 pivotally supported on the body of valve cartridge 36. Preferably, pivotal support for the lever arm is provided on body 56 by a split wire ring 100 received in a radially inwardly opening groove 102 adjacent the upper end of bore portion 58. Upper end 56a of the body is provided with a radially extending opening 104 between the outer side thereof and the upper end of bore portion 58 and which opening receives end 44a of the lever arm. More particularly, in the embodiment illustrated end 44a of the lever arm includes a U-shaped recess 44c adapted to receive the portion of ring 100 extending circumferentially across opening 104, and the portion of lever arm 44 radially inwardly adjacent recess 44c engages the adjacent peripheral edge of end 94 of sleeve 92 of the stem assembly. Accordingly, it will be appreciated that the lever arm is readily removable from its supported engagement with body 56. While it would be possible to close end 44a of the lever arm around split ring 100 so as to preclude separation of the lever arm from the split ring, it is preferred to provide for the lever arm to be readily separable as shown in that the lever arm generally is not damaged or worn during use so as to require replacement in conjunction with replacement of the valve cartridge. The preferred lever arm structure and mounting arrangement provide for selectivity with respect to replacement of the lever arm.

Referring again to FIGS. 1-3 of the drawing, it will be appreciated that valve cartridge 36 is axially slidably received in recess 34 of lower housing portion 16. When seated in the recess, annular rib 73 at lower end 56b of the body engages shoulder 35 in recess 34, O-ring 74 in groove 72 sealingly interengages with shoulder 35 and the wall of recess 34, and O-ring 74 in groove 70 sealingly interengages with the wall of recess 34. The interior of lower housing portion 16 includes a wall portion 106 below which recess 34 extends and which is coplanar with the lower circumferential edge of groove 76 in body 56 of the valve cartridge when the latter is seated in recess 34. Unintended axial displacement of cartridge 36 from its seated position in recess 34 is precluded by a threaded fastener 108 mounted in an opening therefor in the lower housing radially outwardly adjacent recess 34. More particularly in this respect, fastener 108 is positioned such that the outer peripheral edge of the head 110 thereof is received in groove 76. As will be further appreciated from FIGS. 1-3, when valve cartridge 36 is seated in recess 34, inlet passageway 38 in lower housing portion 16 opens into recess 34 at a location axially between O-ring seals 74 and thus in the area of recess 66 and inlet ports 68 in the cartridge body. Outlet passageway 40 in lower housing portion 16 opens into recess 34 below the lower end of cartridge 36 and thus is sealed relative to inlet passageway 38 by O-ring seal 74 in groove 72 at the lower end of the cartridge body.

It is believed that operation of the pressure regulator and cartridge valve 36 will be obvious from the foregoing description. Briefly in this respect, the component parts are normally in the positions shown in the drawing, whereby sealing and biasing diaphragm 96 in the valve cartridge unit biases the stem assembly for valve element 86 to engage seat 75 and close the outlet port defined by lower bore portion 64 in body 56. When the user of the apparatus inhales through user utilization device 14, the pressure in lower diaphragm chamber 28 is reduced as a result of the communication thereof with outlet passageway 40 through passageway 42. Reduction of the pressure in diaphragm chamber 28 displaces diaphragm 22 downwardly from the position shown in FIGS. 2 and 3 of the drawing, thus pivoting lever arm 44 clockwise relative to cartridge body 56 from the position of the lever arm shown in FIGS. 2 and 4 of the drawing. Such pivotal movement of the lever arm displaces valve stem assembly 78 downwardly from the position shown in FIG. 4, whereby valve element 86 disengages from seat 75 opening the outlet port defined by lower bore portion 64. Opening of the outlet port allows breathing gas under pressure to flow from source 12 through inlet passageway 38 into recess 66 of body 56 and thence through inlet ports 68 and through the outlet port to the lower end of recess 34 in lower housing portion 16. The breathing gas then flows to the user through outlet passageway 40. When the user exhales, the pressure in diaphragm chamber 28 increases and diaphragm 22 returns to the position thereof shown in FIGS. 2 and 3 of the drawing. The back pressure against head 80 of stem assembly 78 together with the bias of diaphragm 96 returns the valve stem assembly to the position shown in FIG. 4 in which valve element 86 engages seat 75 to close the outlet port. Pushrod 48 behind diaphragm 22 in the regulator housing enables the user to override the closing function of the flow control valve. More particularly in this respect, the depression of pushrod 48 manually displaces diaphragm 22 downwardly from the position shown in FIGS. 2 and 3 of the drawing and against lever arm 44, whereby the valve stem assembly 78 is displaced to the open position. When the pushrod is released, the regulator again functions in response to the user's inhaling and exhaling as described above.

When it is necessary or desirable to access the valve cartridge for inspection, cleaning and/or replacement thereof, such access is readily achieved simply by removing upper housing portion 18 from lower portion 16, lifting diaphragm 22 off of the lower housing, and then unscrewing fastener 108 to release the valve cartridge assembly for sliding removal from recess 34. Replacement of the valve cartridge and reassembly of the regulator is likewise readily achieved by axially sliding the cartridge into recess 34, securing the cartridge through fastener 108, and reassembling the diaphragm and upper housing portion.

Figure 7:
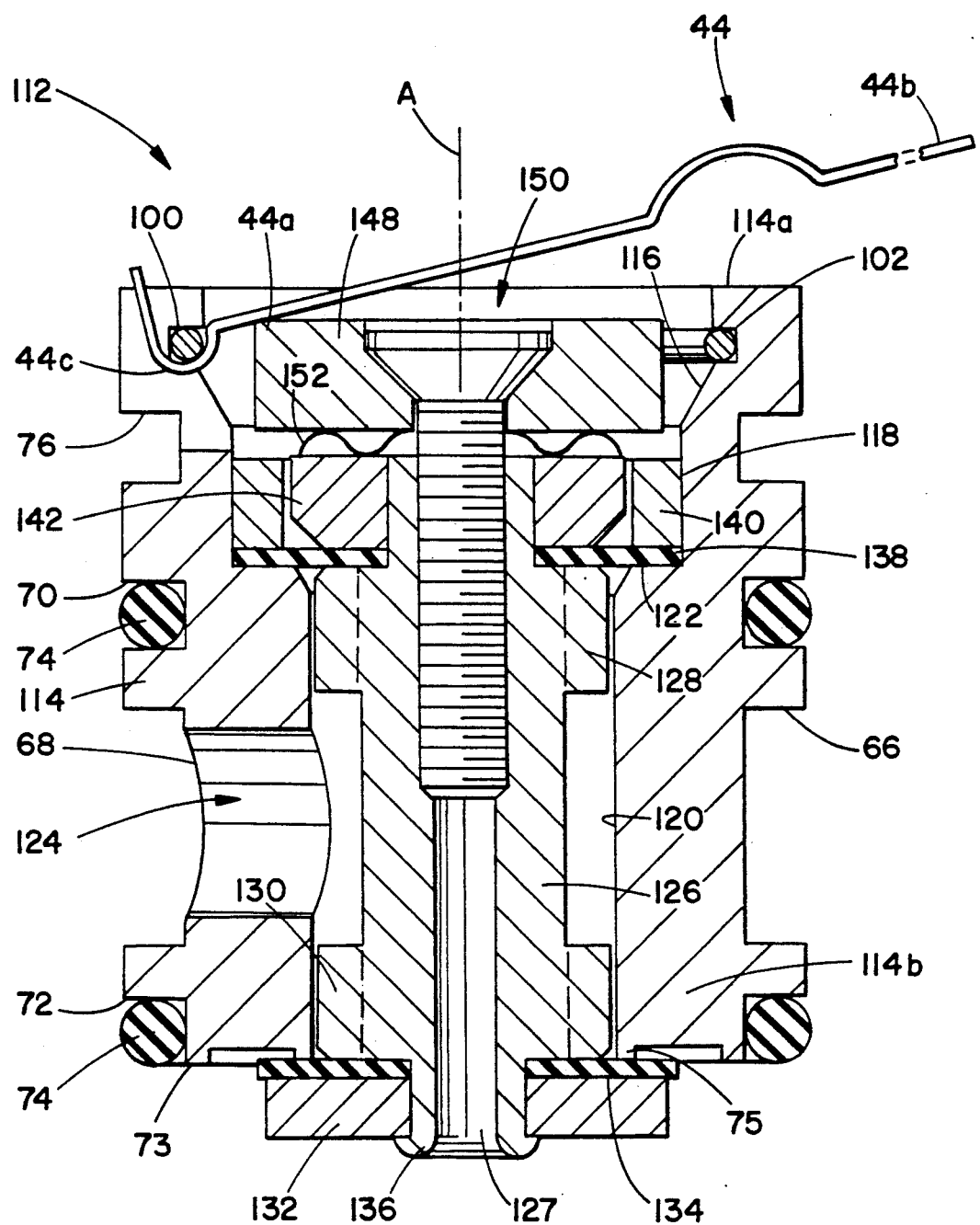

Another embodiment of a valve cartridge according to the present invention is illustrated in FIG. 7 of the drawing. Component parts of the valve cartridge in FIG. 7 corresponding to the valve cartridge illustrated in FIGS. 3–6 are designated by corresponding numerals. The valve cartridge in FIG. 7, designated generally by the numeral 112, includes a cylindrical body 114 having upper and lower ends 114a and 114b, respectively. A bore extends through the body between the upper and lower ends thereof and is coaxial with axis A of the body and has an outwardly tapered upper portion 116, an intermediate portion 118 and a lower portion 120. The intermediate and lower portions of the bore are of different diameters to provide a radially inwardly extending peripheral shoulder 122 therebetween.

Valve cartridge 112 further includes a valve stem assembly 124 coaxial with axis A and axially slidably received in the bore in body 114. In this embodiment, the valve stem assembly includes a tubular valve stem member 126 having enlarged upper and lower portions 128 and 130, respectively. Each of the portions 128 and 130 is square in peripheral contour and dimensioned for the major diametric points thereof to slidably interengage with lower bore portion 120 for guidance of the stem assembly during reciprocation thereof. The lowermost end of stem member 126 extends axially outwardly of the lowermost end of body 114 and is provided with a head member 132 and a resilient annular valve element 134 which is axially captured between head 132 and the lower end of enlarged portion 130 of the valve stem member. In this embodiment, head member 132 is mounted on valve stem member 126 by peripherally beading the lowermost end of the valve stem member outwardly of head member 132 as indicated by the numeral 136. An annular, flat biasing and sealing diaphragm 138 of suitable resilient material surrounds the upper end of valve stem member 126 and has its radially inner periphery clampingly engaged against the upper side of enlarged portion 128 by means of a retaining ring 140 which is press fitted on the upper end of the stem member. The radially outer periphery of diaphragm 138 is axially engaged against shoulder 122 by means of a retaining ring 142 which is press fitted in bore portion 118. The lower end of lower bore portion 120 provides an outlet port for the valve and, as in the earlier embodiment, the outer end face of lower end 114b of body 114 is axially recessed to provide an annular valve seat 75 about the outlet port and an annular rib 73 adjacent O-ring groove 72. In this embodiment, a single inlet port 68 opens radially through the body recess 66 to lower bore portion 120, and biasing and sealing diaphragm 138 seals the bore between port 68 and the upper end of the housing and biases the valve stem assembly to the position shown in FIG. 7 and in which valve element 134 engages seat 75 to close the outlet port.

Valve stem assembly 124 further includes a head member 148 secured to the upper end of valve stem member 126 by means of a headed fastener 150 having a threaded shank threadedly interengaged with the internally threaded upper end of bore 127 in stem member 126. An annular, resilient wave washer 152 is disposed between head 148 and retaining ring 140 and, together with fastener 150, provides for axially adjusting the position of head 148 relative to stem member 126. This axial adjustment enables adjustment of the angle of incline of lever arm 44 relative to axis A and, thus, the position of end 44b of the lever arm relative to the regulator diaphragm when the valve cartridge is positioned in the recess therefor in the regulator housing. It will be appreciated that valve cartridge 112 is dimensioned to be received in and to sealing interengage with recess 34 in lower housing 16 in the manner described hereinabove in connection with the earlier embodiment. It will likewise be appreciated that valve cartridge 112 when mounted in the regulator housing is operable in the same manner described hereinabove with regard to the earlier embodiment.

While considerable emphasis has been placed herein on the structures of the preferred embodiments, it will be appreciated that other embodiments of the invention can be made and changes can be made in the embodiments herein illustrated and described without departing from the principles of the present invention. Accordingly, it is to be distinctly understood that the foregoing descriptive matter is to be interpreted merely as illustrative of the invention and not as a limitation.

Having thus described the invention, it is claimed:

1. A valve cartridge assembly for a pressure regulator for supplied air breathing apparatus, said pressure regulator including housing means having a recess slidably receiving said valve cartridge assembly, a diaphragm supported by said housing means and valve stem actuator means between said diaphragm and said valve assembly, said valve cartridge assembly comprising, body means receivable in said recess and having first and second ends and a cylindrical bore therethrough between said first and second ends, said bore having an axis, said body means having an outer surface between said first and second ends thereof and at least one inlet port from said outer surface to said bore between said first and second ends, said bore at said second end of said body means providing an outlet port, means providing valve seat means about said outlet port, valve stem means axially slidably supported in said bore and having first and second ends respectively adjacent said first and second ends of said body means, valve element means on said second end of said valve stem means, said valve stem means being axially displaceable between closed and open positions in which said valve element means respectively engages said seat means to close said outlet port and disengages said seat means to open said outlet port, biasing and sealing means between said stem means and said bore biasing said stem means toward said closed position and sealing said stem means and said bore between said first end of said body means and said inlet port, and seal means on said outer surface of said body means for sealing engagement with said recess in said regulator housing means, said seal means surrounding said outer surface on axially opposite sides of said inlet port.

2. A valve cartridge assembly according to claim 1, and support means on said first end of said body means for supporting said valve stem actuator means for displacing said valve stem means in the direction from said closed toward said open position thereof.

3. A valve cartridge assembly according to claim 1, and means on said outer surface of said body means for retaining said cartridge assembly in said recess in said regulator housing means.

4. A valve cartridge assembly according to claim 1, wherein said biasing and sealing means includes annular resilient sealing member means having radially inner and outer portions respectively sealingly interengaged with said stem means and said bore.

5. A valve cartridge assembly according to claim 1, wherein said second end of said body means has an outer end face transverse to said bore axis and said means providing valve seat means includes an axially outwardly projecting annular lip on said end face.

6. A valve cartridge assembly according to claim 1, wherein said valve stem means includes stem member means and said valve element means on said second end of said valve stem means includes support member means on said stem member means transverse to said bore axis and resilient sealing element means on said support member means for engaging said seat means in said closed position of said stem means.

7. A valve cartridge assembly according to claim 1, wherein said outer surface of said body means includes annular grooves on axially opposite sides of said inlet port and said sealing means includes an annular resilient sealing element in each of said annular grooves.

8. A valve cartridge assembly according to claim 1, wherein said outer surface of said body means includes a recess axially adjacent said first end of said body for retaining said cartridge assembly in said regulator housing means recess.

9. A valve cartridge assembly according to claim 1, wherein said body means includes an annular ring groove in said bore at said first end of said body means, and split ring means received in said ring groove for supporting said valve stem actuator means on said first end of said body means.

10. A valve cartridge assembly according to claim 1, wherein said valve stem actuator means includes arm means pivotally supported in said first end of said body means, said arm means extending diametrically across said first end of said body means and having a portion engaging sad first end of said valve stem means.

11. A valve cartridge assembly for a pressure regulator for supplied air breathing apparatus, said pressure regulator including housing means having a recess slidably receiving said valve cartridge assembly, a diaphragm supported by said housing means and valve stem actuator means between said diaphragm and said valve assembly, said valve cartridge assembly comprising, cylindrical body means having an axis and axially opposite first and second ends, a bore through said body means coaxial with said axis, said body means having an outer surface between said first and second ends thereof, at least one inlet port opening radially through said body means from said outer surface to said bore between sad first and second ends of said body means, said bore at said second end of said body means providing an outlet port, valve stem means axially slidably supported din said bore and having a first end at said first end of said body means and a second end axially outwardly adjacent said second end of said body means, said body means including means providing seat means about said outlet port, valve element means on said second end of said valve stem means, said valve stem means being axially displaceable between closed and open positions in which said valve element means respectively engages and disengages said seat means, annular seal means extending about said outer surface of said body means on axially opposite sides of said inlet port, annular resilient biasing and sealing means surrounding said valve stem means and having a radially inner portion attached to said valve stem means and a radially outer portion attached to said body means in said bore between said first end of said body means and said inlet port, valve stem actuator support means mounted on said first end of said body means radially outwardly of said first end of said valve stem means, and said outer surface of said body means adjacent said first end thereof including means for retaining said valve cartridge assembly in said recess in said regulator housing means.

12. A valve cartridge assembly according to claim 11, wherein said valve stem means includes a stem member coaxial with said axis and having opposite ends, a head at one of said opposite ends providing said second end of said valve stem means, the other of said opposite ends being adjacent said first end of said body means, said valve element means including a resilient annular member surrounding said stem member and engaging said head, sleeve means surrounding said stem member and having one end engaging said annular member against said head, said sleeve means having a second end at said other end of said stem member, and said second end of said sleeve means and said other end of said stem member including means interengaging to retain said sleeve means on said stem member.

13. A valve cartridge assembly according to claim 12, wherein said sleeve means include first and second sleeve members having opposed inner ends between said opposite ends of said stem member, said radially inner portion of said biasing and sealing means being axially clamped between said opposed inner ends of said sleeve members.

14. A valve cartridge assembly according to claim 13, wherein said bore includes a radially inwardly extending annular shoulder between said inlet port and said first end of said body means, and annular retaining ring means in said bore having an inner end facing said shoulder, said radially outer portion of said biasing and sealing means being axially clamped between said shoulder and said inner end of said retaining ring means.

15. A valve cartridge assembly according to claim 14, wherein said retaining ring means and said first sleeve member include radially spaced surfaces providing an annular space therebetween, and said biasing and sealing means includes an annular undulated portion extending axially into said annular space.

16. A valve cartridge assembly according to claim 14, wherein said first sleeve member has an outer end slidably interengaging with said retainer ring means and said second sleeve member has an outer end slidably interengaging with said bore at said second end of said body means.

17. A valve cartridge assembly according to claim 16, wherein said retaining ring means and said first sleeve member include radially spaced surfaces providing an annular space therebetween, and said biasing and sealing means surrounding said stem means includes an annular undulated portion extending axially into said annular space.

18. A valve cartridge assembly according to claim 17, wherein said body means includes an annular recess opening into said bore at said first end of said body means, said valve stem actuator support means including split ring means received in said recess.

19. A valve cartridge assembly according to claim 18, wherein said valve stem actuator means includes a valve stem actuating arm extending diametrically across said first end of said body means and having a first end pivotally engaging with said split ring means and a second end spaced from said first end, said outer end of said first sleeve member of said valve stem means having an end edge, and said arm having a portion radially inwardly adjacent said first end thereof engaging said end edge.

20. A valve cartridge assembly according to claim 18, wherein said outer surface of said body means includes annular grooves on axially opposite sides of said inlet port and said annular seal means are resilient sealing rings in said grooves.

21. A valve cartridge according to claim 20, wherein said means for retaining said cartridge assembly in said recess in said regulator housing means includes radially inwardly extending recess means in said outer surface of said body means.

22. A valve cartridge assembly according to claim 21, wherein said valve stem actuator means includes a valve stem actuating arm extending diametrically across said first end of said body means and having a first end pivotally engaging with said split ring means and a second end spaced from said first end, sad outer end of said first sleeve member of said valve stem means having an end edge, and said arm having a portion radially inwardly adjacent sid first end thereof engaging said end edge.

23. A valve cartridge assembly according to claim 11, wherein said valve stem means includes a stem member coaxial with said axis and having opposite ends, a first head at one of said opposite ends providing said first end of said valve stem means, a second head of the other of said opposite ends providing said second end of said valve stem means, said valve element means including a resilient annular member surrounding said stem member and engaging said second head, and means axially adjustably mounting said first head to said one end of said stem member.

24. A valve cartridge assembly according to claim 23, wherein said one end of said stem member includes a radially outwardly extending annular shoulder axially inwardly of said first head, a first retaining ring on said one end of said stem member having an inner end facing said shoulder, and said radially inner portion of said biasing and sealing means being axially clamped between said shoulder and said inner end of said first retaining ring.

25. A valve cartridge assembly according to claim 24, wherein said bore includes a radially inwardly extending annular shoulder between said inlet port and said first end of said body means, a second retaining ring in said bore having an inner end facing said shoulder in said bore, and said radially outer portion of said biasing and sealing means being axially clamped between said shoulder in said bore and said inner end of said second retaining ring.

26. A valve cartridge assembly according to claim 25, wherein said biasing and sealing means includes a radially extending flat member.

27. A valve cartridge assembly according to claim 25, wherein said valve stem member includes first guide means slidably interengaging with said bore adjacent said shoulder in said bore and second guide means slidably interengaging with said bore at said second end of said body means.

28. A valve cartridge assembly according to claim 25, wherein said means adjustably mounting said first head to said one end of said stem member includes annular, axially compressible biasing means between said first head and said one end of said stem member, and threaded caster means interengaging said one end and said first head.

29. A valve cartridge assembly according to claim 28, wherein said body means includes an annular recess opening into said bore at said first end of said body means, said valve stem actuator support means including split ring means received in said recess.

30. A valve cartridge assembly according to claim 29, wherein said valve stem actuator means includes a valve stem actuating arm extending diametrically across said first end of said body means and having a first end pivotally engaging with said split ring means and a second end spaced from said first end, said first head on said valve stem member having an end edge, and said arm having a portion radially inwardly adjacent said first end thereof engaging said end edge.

31. A valve cartridge assembly according to claim 28, wherein said outer surface of said body means includes annular grooves on axially opposite sides of said inlet port and said annular seal means are resilient sealing rings in said grooves.

32. A valve cartridge according to claim 31, wherein said means for retaining said cartridge assembly in said recess in said regulator housing means includes axially inwardly extending recess means in said outer surface of said body means.

33. A valve cartridge assembly according to claim 32, wherein said biasing and sealing means includes a radially extending flat member.

34. A valve cartridge assembly according to claim 33, wherein said valve stem member includes first guide means slidably interengaging with said bore adjacent said shoulder in said bore and second guide means slidably interengaging with said bore at said second end of said body means.

35. A valve cartridge assembly according to claim 34, wherein said body means includes an annular recess opening into said bore at said first end of said body means, said valve stem actuator support means including split ring means received in said recess.

36. A valve cartridge assemlby according to claim 35, wherein said valve stem actuator means includes a valve stem actuating arm extending diametrically across said first end of said body means and having a first end pivotally engaging with said split ring means and a second end spaced from said first end, said first head on said valve stem member having an end edge, and said arm having a portion radially inwardly adjacent said first end thereof engaging said end edge.

* * * * *